(12) United States Patent
Sun et al.

(10) Patent No.: US 9,644,970 B2
(45) Date of Patent: May 9, 2017

(54) PARKING GARAGE ENVIRONMENT DETECTION AND EHPE DETERMINATION FOR VEHICULAR NAVIGATION

(71) Applicant: GENERAL MOTORS LLC, Detroit, MI (US)

(72) Inventors: Debo Sun, West Covina, CA (US); Curtis L. Hay, West Bloomfield, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 405 days.

(21) Appl. No.: 14/083,707

(22) Filed: Nov. 19, 2013

(65) Prior Publication Data

US 2015/0142309 A1    May 21, 2015

(51) Int. Cl.
*G01C 21/16* (2006.01)
*B60W 10/00* (2006.01)
*G01C 21/20* (2006.01)

(52) U.S. Cl.
CPC ......... *G01C 21/165* (2013.01); *B60W 10/00* (2013.01); *G01C 21/206* (2013.01)

(58) Field of Classification Search
CPC .... G01C 21/206; G01C 21/165; B60W 10/00
See application file for complete search history.

(56) References Cited

U.S. PATENT DOCUMENTS

| 7,139,647 | B2 * | 11/2006 | Larsen | G01C 21/00 |
| | | | | 342/357.45 |
| 8,374,785 | B2 * | 2/2013 | McBurney | G01C 21/12 |
| | | | | 701/472 |
| 2009/0063051 | A1 * | 3/2009 | Watanabe | G01C 21/26 |
| | | | | 701/472 |
| 2014/0121962 | A1 * | 5/2014 | Rao | G01C 21/16 |
| | | | | 701/500 |

* cited by examiner

*Primary Examiner* — Mussa A Shaawat
*Assistant Examiner* — Michael Kerrigan
(74) *Attorney, Agent, or Firm* — Leydig, Voit & Mayer, Ltd.

(57) ABSTRACT

Implementations of the present invention contemplate obtaining a more accurate estimated horizontal position error (EHPE) under conditions in which the telematics unit of a vehicle cannot receive GNSS signals. In particular, the invention contemplates determining that a vehicle is entering a parking garage and obtaining a more accurate estimated horizontal position error (EHPE) of the vehicle in the parking garage when GNSS signals are unavailable.

20 Claims, 4 Drawing Sheets

PARKING GARAGE ENVIRONMENT DETECTION AND EHPE DETERMINATION FOR VEHICULAR NAVIGATION

TECHNOLOGY FIELD

The present disclosure relates generally to vehicular telematics systems and more specifically to the use of a telematics unit within a vehicle for navigation within covered structures such as parking garages.

BACKGROUND

Telematics units within mobile vehicles provide subscribers with connectivity to a telematics service provider (TSP). The TSP provides subscribers with an array of services ranging from emergency call handling and stolen vehicle recovery to diagnostics monitoring, global navigation system aided position identification, map services, and turn-by-turn navigation assistance. Telematics units are often provisioned and activated at a point of sale when a subscriber purchases a telematics-equipped vehicle. Once provisioned and activate, telematics units can be utilized by a subscriber to obtain telematics services, such as those described herein, from the TSP.

One service provided by a TSP is a Global Navigation Satellite System (GNSS) based navigation service. GNSS is a generic term referring to any of multiple satellite constellation-based global positioning networks including, for example, the Global Positioning System (GPS) constellation. Another GNSS constellation network is the Global Navigation Satellite System (GLONASS). A particular example of a GNSS based navigation service is the provision of turn-by-turn (TBT) directions from a current location of a vehicle or an alternative start location to a specified destination.

However, under certain conditions, GNSS signals received by the telematics unit in a vehicle are too weak to provide meaningfully accurate information regarding the position of the vehicle. For example, the telematics unit in a vehicle traveling in a parking garage, tunnel, or other underground or covered structure may be unable to receive GNSS signals. Under such conditions, the driver of the vehicle is unable to rely on the GNSS navigation services provided by the TSP. In order to provide navigation services under conditions where GNSS signals are too weak, the telematics unit must rely on a Dead Reckoning (DR) system. However, DR systems are not able to provide position information with the level of accuracy provided by a GNSS.

SUMMARY OF THE INVENTION

Implementations of the present invention contemplate obtaining a more accurate estimated horizontal position error (EHPE) under conditions in which the telematics unit of a vehicle cannot receive GNSS signals. In particular, the invention contemplates determining that a vehicle is entering a parking garage and obtaining a more accurate estimated horizontal position error (EHPE) of the vehicle in the parking garage when GNSS signals are unavailable.

One implementation consists of a method, implemented at a telematics unit of a vehicle, for calculating the estimated horizontal position error (EHPE) of a position of a vehicle provided by a dead reckoning (DR) system, the method comprising determining that the vehicle is operating within a parking garage, wherein determining that the vehicle is operating within a parking garage triggers the use of a parking garage mode by a DR system of the telematics unit, and determining the EHPE of the vehicle according to the parking garage mode of the DR system.

An additional implementation consists of a computer readable medium having stored thereon a set of computer executable instructions for calculating the estimated horizontal position error (EHPE) of a position of a vehicle provided by a dead reckoning (DR) system, the set of instructions comprising instructions for determining that the vehicle is operating within a parking garage, wherein determining that the vehicle is operating within a parking garage triggers the use of a parking garage mode by a DR system of the telematics unit, and determining the EHPE of the vehicle according to the parking garage mode of the DR system.

A further implementation consists of a telematics unit configured to receive GNSS signals and to determine the position of a vehicle through dead reckoning (DR) techniques when it is unable to receive GNSS signals, the telematics unit comprising a processor configured to determine that the vehicle is operating within a parking garage and further configured to execute a parking garage DR mode upon determining that the vehicle is operating within the parking garage wherein the parking garage DR mode determines an estimated horizontal position error (EHPE) of the position of the vehicle.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1:
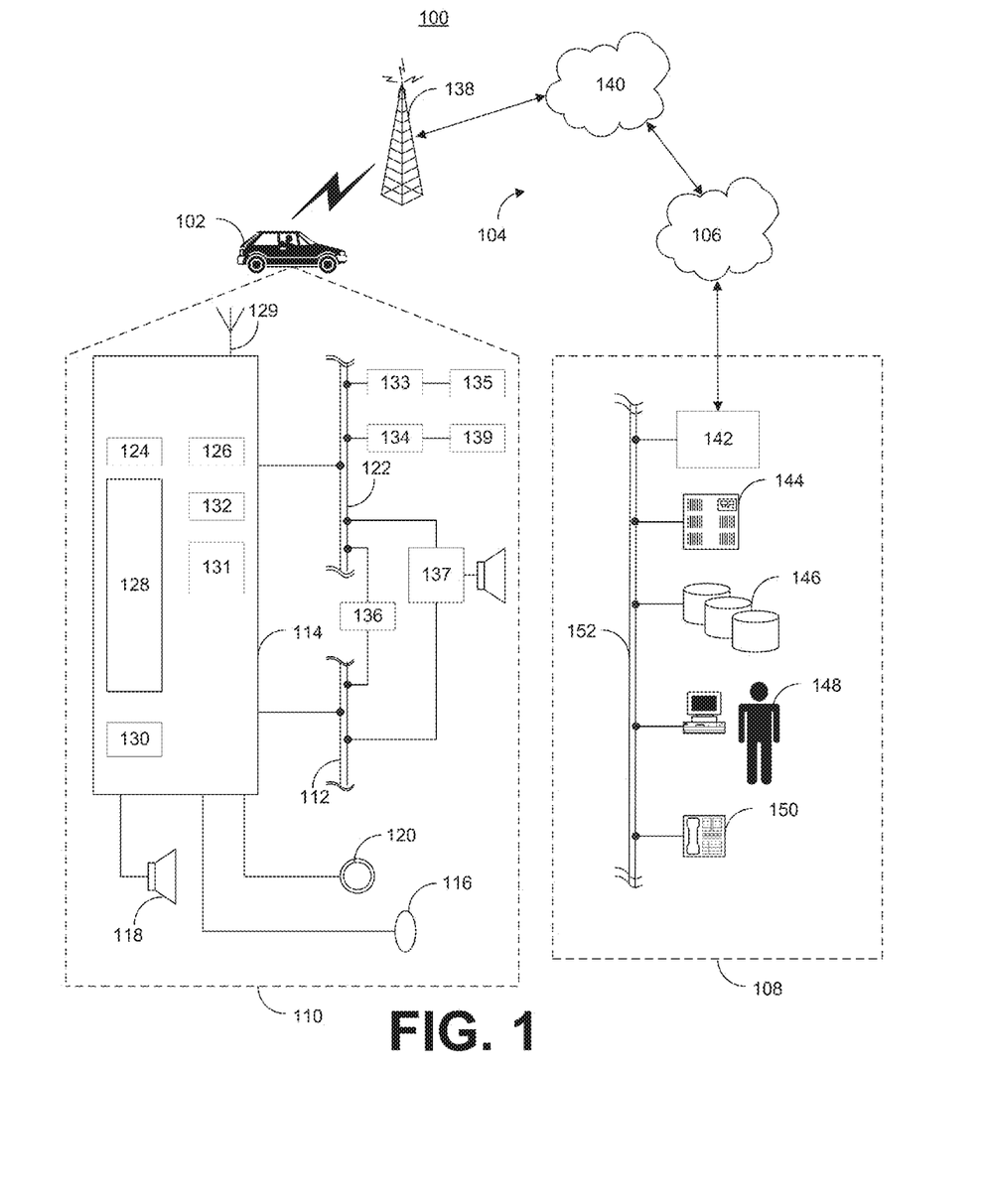
FIG. 1 is a schematic diagram of an operating environment for a mobile vehicle communication system, which includes a call center of a telematics service provider, usable in implementations of the described principles.

Before discussing the details of the invention, a brief overview of an example telematics system is given to guide the reader. FIG. 1 schematically depicts an example environment for carrying out the invention. It will be appreciated that the described environment is an example, and does not imply any limitation regarding the use of other environments to practice the invention. With reference to FIG. 1 there is shown an example of a communication system 100 that may be used with the present systems and methods and generally includes a vehicle 102, a wireless carrier system 104, a land network 106 and a call center 108 of a telematics service provider (TSP). It should be appreciated that the overall architecture, setup and operation, as well as the individual components of a system such as that shown in FIG. 1 are generally known in the art. Thus, the following paragraphs provide a brief overview of one such example information system 100. However, present systems and methods could be carried out in other environments as well.

Vehicle 102 is a mobile vehicle such as a motorcycle, car, truck, recreational vehicle (RV), etc., and is equipped with suitable hardware and software that enables it to communicate over system 100. Additionally, vehicle hardware 110 shown generally in FIG. 1 includes: a telematics unit 114, a microphone 116, a speaker 118, and buttons and/or controls 120 connected to the telematics unit 114. A network connection or vehicle bus 122 is operatively coupled to the telematics unit 114. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name but a few.

The telematics unit 114 is an onboard device providing a variety of services through its communication with the call center 108, and generally includes an electronic processing device 128, one or more types of electronic memory 130, a cellular chipset/component 124, a wireless modem 126, a dual antenna 129 and a navigation unit containing a GNSS chipset/component 132. The GNSS chipset/component may be, e.g., a GPS chipset/component. The GNSS chipset/component is capable of determining the location of the vehicle with a high degree of accuracy. For example, the GNSS chipset, component could determine that an electric vehicle is located at a particular electric vehicle charging station. In one example, the wireless modem 126 comprises, and is carried out in the form of, a computer program and/or set of software routines executing within the electronic processing device 128. The cellular chipset/component 124 and the wireless modem 126 may be called the network access device (NAD) of the telematics unit 114. The NAD 114 further includes a short-range wireless unit 131 capable of communicating with a user's mobile device such as a cellular phone, tablet computer, PDA, or the like, over a short-range wireless protocol. For example, in one implementation, the short-range wireless unit 131 is a Bluetooth unit with an RF transceiver that communicates with a user's mobile device using Bluetooth protocol.

The telematics unit 114 provides a variety of services for subscribers. Examples of such services include: turn-by-turn directions and other navigation-related services provided in conjunction with the GNSS based chipset/component 132; airbag deployment notification and other emergency or roadside assistance-related services provided in connection with various crash and or collision sensor interface modules 133 and sensors 135 located throughout the vehicle.

GNSS navigation services are implemented based on the geographic position information of the vehicle provided by the GNSS based chipset/component 132. A user of the telematics unit enters a destination using inputs corresponding to the GNSS component, and a route to a destination is calculated based on the destination address and a current position of the vehicle determined at approximately the time of route calculation. Turn-by-turn (TBT) directions may further be provided on a display screen corresponding to the GNSS component and/or through vocal directions provided through a vehicle audio component 137. It will be appreciated that the calculation-related processing may occur at the telematics unit or may occur at a call center 108. Furthermore, the telematics unit 114 may be configured to determine, based upon information provided by the GNSS based chipset/component 132, that the vehicle 102 is entering or is about to enter a parking structure. In some implementations, the GNSS based chipset/component 132 itself is configured to determine that the vehicle 102 is about to enter a parking garage. For example, the GNSS based chipset/component 132 may execute software that includes the locations of all known parking structures and that issues a notification when the vehicle travels into one of the known multi-level parking garages.

The telematics unit 114 further includes a dead reckoning engine 127 which is a component of the electronic processing device 128. The dead reckoning engine 127 is a processor that is configured to determine an estimated horizontal position error (EHPE) of the position of the vehicle. The dead reckoning engine may calculate the EHPE under a variety of circumstances and may utilize a variety of techniques to calculate the EHPE depending on the circumstance. For example, The dead reckoning engine 127 of the telematics unit 114 may utilize one technique to calculate the EHPE when the GNSS chipset/component 132 is receiving signals from a GNSS satellite and may utilize a different technique to calculate the EHPE when the GNSS chipset/component 132 is not receiving a signal from a GNSS satellite or is receiving a signal that is too weak to be utilized. The dead reckoning engine 127 may also utilize a different technique to calculate the EHPE when it is determined that the vehicle has entered a parking structure.

Infotainment-related services are provided by the TSP wherein music, Web pages, movies, television programs, video games and/or other content is downloaded to an infotainment center 136 operatively connected to the telematics unit 114 via a vehicle bus 122 and an audio bus 112. In one example, downloaded content is stored for current or later playback.

The preceding list of functions is by no means an exhaustive list of all of the capabilities of telematics unit 114, as should be appreciated by those skilled in the art, but is simply an illustration of some of the services that the telematics unit 114 offers. The telematics unit 114 may include a number of components known by those skilled in the art is addition to those described above.

Vehicle communications use radio transmissions to establish a communications channel within the wireless carrier system. 104 so that voice and/or data transmissions occur over the communications channel. Vehicle communications are enabled via the cellular chipset/component 124 for voice communications and a wireless modem 126 for data transmission. For example, data pertaining to a forecast of a utility's renewable energy mixture can be transmitted to the telematics unit 114 via the wireless modem 126.

To enable successful data transmission over the communications channel, wireless modem 126 applies some form of encoding or modulation to convert the digital data so that it can communicate through a vocoder or speech codec incorporated in the cellular chipset/component 124. Any suitable encoding or modulation technique that provides an acceptable data rate and bit error can be used with the present method. The dual mode antenna 129 services the GLASS chipset/component and the cellular chipset/component.

The microphone 116 provides the driver or other vehicle occupant with a means for inputting verbal or other auditory commands, and can be equipped with an embedded voice processing unit utilizing a human/machine interface (HMI) technology known in the art. Conversely, the speaker 118 provides verbal output to the vehicle occupants and can be either a stand-alone speaker specifically dedicated for use with the telematics unit 114 or can be part of the vehicle audio component 137. In either event, the microphone 116 and the speaker 118 enable vehicle hardware 110 and the call center 108 to communicate with the occupants through audible speech.

The vehicle hardware also includes the one or more buttons or controls 120 configured to enable a vehicle occupant to activate or engage one or more of the vehicle hardware components 110. For example, one of the buttons 120 is an electronic push button that, when pressed, initiates voice communication with the call center 108 (whether it be a live advisor 148 or an automated call response system). In another example, one of the buttons 120, when pushed, initiates emergency services.

The audio component 137 is operatively connected to the vehicle bus 122 and the audio bus 112. The audio component 137 receives analog information, rendering it as sound, via the audio bus 112. Digital information is received via the vehicle bus 122. The audio component 137 provides AM and FM radio, CD, DVD, and multimedia functionality independent of the infotainment center 136. The audio component 137 contains a speaker system, or alternatively utilizes the speaker 118 via arbitration on the vehicle bus 122 and/or the audio bus 112.

The vehicle crash and/or collision detection sensor interface 133 is operatively connected to the vehicle bus 122. The crash sensors 135 provide information to the telematics unit 114 via the crash and/or collision detection sensor interface 133 regarding the severity of a vehicle collision, such as the angle of impact and the amount of force sustained. Vehicle sensors 139, connected to various sensor interface modules 134 are operatively connected to the vehicle bus 122. The vehicle sensors 139 can also include but are not limited to gyroscopes, accelerometers, magnetometers, emission detection and/or control sensors, and the like. The sensor interface modules 134 can include power train control, climate control, and body control, to name but a few.

The wireless carrier system 104 can be a cellular telephone system or any other suitable wireless system that transmits signals between the vehicle hardware 110 and the land network 106. According to an example, the wireless carrier system 104 includes one or more cell towers 138, base stations and/or mobile switching centers (MSCs) 140, as well as any other networking components required to connect the wireless system 104 with the land network 106. The mobile switching center may include a remote data server.

As appreciated by those skilled in the art, various cell tower/base station/MSC arrangements are possible and could be used with the wireless system 104 (also referred to as the "cellular network" herein). For example, a base station and a cell tower could be co-located at the same site or they could be remotely located, a single base station could be coupled to various cell towers, and various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network component as well.

The land network 106 is, for example, a conventional land-based telecommunications network connected to one or more landline telephones and connecting wireless carrier network 104 to call center 108. For example, the land network 106 includes a public switched telephone network (PSTN) and/or an Internet protocol (IP) network, as is appreciated by those skilled in the art. Of course, one or more segments of the land network 106 are implemented in the form of a standard wired network, a fiber or other optical network, a cable network, other wireless networks such as wireless local networks (WLANs) or networks providing broadband wireless access (BWA) or any combination thereof.

The call Center (OCC) 108 of the telematics service provider is designed to provide the vehicle hardware 110 with a number of different system back-end functions and, according to the example shown here, generally includes one or more switches 142, servers 144, databases 146, live advisors 148, and a variety of other telecommunication and computer equipment 150 that is known to those skilled in the art. These various call center components are coupled to one another, for example, via a network connection or bus 152, such as the one previously described in connection with the vehicle hardware 110. Switch 142, which can be a private branch exchange (PBX) switch, roues incoming signals so that voice transmissions are usually sent to either the live advisor 148 or an automated response system, and data transmissions are passed on to a modem or other piece of telecommunication and computer equipment 150 for demodulation and further signal processing.

The telecommunication and computer equipment 150 includes a modem that preferably includes an encoder, as previously explained, and can be connected to various devices such as application servers 144 and databases 146. For example, the databases 146 could be designed to store subscriber profile records or any other pertinent subscriber information. Although the illustrated example has been described as it would be used in conjunction with a manned call center, it will be appreciated that the call center 108 can be any central or remote facility, manned or unmanned, mobile or fixed, to or from which it is desirable to exchange voice and data. The servers 144 interface with databases 146 and telematics units such as the telematics unit 114. The servers 144 have processors that can be configured to request and receive information from telematics units such as the telematics unit 114. In some implementations, information requested and received by the servers 144 is subsequently stored in the databases 146.

In general terms, not intended to limit the claims, the example environment depicted by FIG. 1 may be used by systems and methods that obtain a more accurate estimated horizontal position error (EHPE) under conditions in which the telematics unit of a vehicle cannot receive GNSS signals. In particular, the invention contemplates determining that a vehicle is entering a parking garage and obtaining a more accurate estimated horizontal position error (EHPE) of the vehicle in the parking garage when GNSS signals are unavailable by utilizing a particular method of determining HUE that accounts for conditions typical of a parking garage environment.

In situations where GNSS signals are weak or unavailable, vehicular navigation systems rely on the use of dead reckoning (DR) systems to calculate an estimate of the current geographical location of the vehicle. DR systems utilize a previously determined position of the vehicle and calculate the estimate of the position of the vehicle at a later point using a plurality of sensor readings. In order to calculate the estimate of the position of the vehicle at a later point in time, the vehicle uses data provided by one or more vehicular sensors to determine a track of the vehicle from the previously determined position. For example, the vehicle sensors can include a vehicle speed sensor, a steering wheel position sensor, and a gyroscope, and can provide sensor data pertaining to, e.g., the vehicle's speed, the number of rotations of the wheels of the vehicle, the heading of the vehicle, the orientation of the vehicle, and the steering wheel position of the vehicle. The vehicle may then utilize a Kalman filter to integrate the data provided by the vehicular sensors with data provided by the GNSS signals to calculate an estimated geographical location of the vehicle when the GNSS signals are weak or unavailable.

Figure 2:
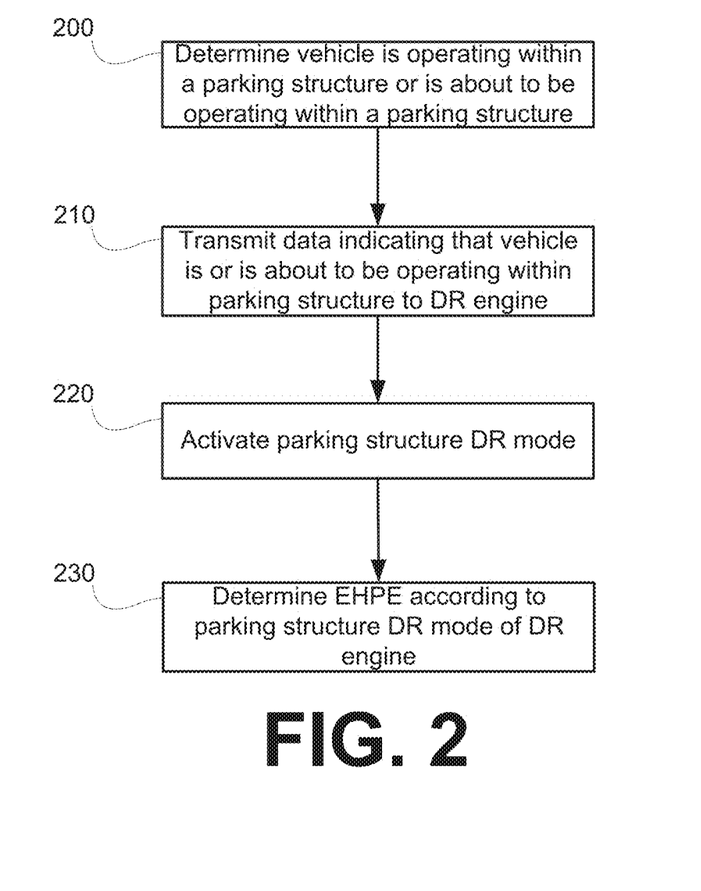
FIG. 2 is a flow chart summarizing an example process executed by a telematics unit of a vehicle for determining the estimated horizontal position error (EHPE) of a position of a vehicle provided by a dead reckoning (DR) system.

In calculating the position of a vehicle when GNSS signals are weak or unavailable, the DR system calculates an estimated horizontal position error (EHPE). Methods for calculating the RIPE are well known in the art. For example, the EHPE can be calculated with the prediction covariance matrix of the Kalman filter. If the prediction covariance matrix of the Kalman filter at time k is $P^-(k)$, and the diagonal elements of $P^-(k)$ are $(P_e^-(k), P_n^-(k))$ where $P_e^-$ is the longitude prediction covariance in meters and $P_n^-(k)$ is the latitude prediction covariance in meters, then the EHPE at time k can be calculated according to the formula. $EHPE(k)=\sqrt{P_e^-(k)+P_n^-(k)}$. FIG. 2, described herein below, is a flow chart summarizing an example process executed by a telematics unit of a vehicle for calculating the estimated horizontal position error (EHPE) of a geographical location of a vehicle provided by a dead reckoning (DR) system. However, calculating the EHPE with the prediction covariance matrix of the Kalman filter is generally not accurate, and the calculated EHPE is frequently much less than the actual horizontal position error.

Additionally, the EHPE can be calculated by multiplying the estimated heading error (EHE) of the vehicle at time k by the distance traveled during a time interval beginning from a previous point in time at which the vehicle's EHPE was calculated. Specifically, the EHPE at time k can be calculated according to the formula $EHPE(k)=(EHPE(k-1)+hE(k) \cdot \Delta d(k)$ where the EHE (in radians) of the vehicle at time k is $hE(k)$, the distance traveled from time k-1 to time k is $\Delta d(k)$, and the EHPE at time is k-1 is $EHPE(k-1)$. The EHE of the vehicle at time k can be calculated according to the equation $hE(k)=hE(j)+\sigma_b(k-j)\Delta t+\sigma_w\sqrt{(k-j)\Delta t}$ where k>j, j is the initial time of propagation, $hE(j)$ is the EHE at time j, $\Delta t$ is the interval between two time points, $\sigma_b$ is the standard deviation of the gyroscope constant drift, and $\sigma_w$ is the standard deviation of the gyroscope measurement noise. However, calculating the EHPE by multiplying the EHE by the distance traveled does not compensate for horizontal position error reductions resulting from 180 degree heading changes and therefore systematically overestimates the horizontal position error in situations in which the vehicle's heading changes by 180 degrees.

In a parking garage environment, a vehicle's heading constantly changes, often by 180 degrees or more. Therefore, calculating the EHPE of the vehicle's position by multiplying the estimated heading error by the distance traveled will not provide an accurate estimate of the actual horizontal position error. Furthermore, calculating the EHPE of the vehicle according to the prediction covariance of the Kalman filter will also not provide an accurate estimate of the actual horizontal position error. Systems and methods of the present disclosure enable a more accurate calculation of the EHPE to be made. The present disclosure contemplates first determining that a vehicle is operating within a parking garage environment, or that operation of the vehicle within a parking garage environment is imminent. The present disclosure further contemplates triggering the execution of a parking garage dead reckoning mode for calculating the EHPE of the vehicle in response to detecting vehicle operation within a parking garage environment or detecting imminent operation within a parking garage.

FIG. 2 is a flow chart summarizing an example process executed by a telematics unit of a vehicle for calculating the estimated horizontal position error (EHPE) of a position of a vehicle provided by a dead reckoning (DR) system. At step 200, the process determines that the vehicle 102 is either operating within a parking garage environment or that operation of the vehicle 102 within a parking garage environment is imminent. Where operation within the parking garage is imminent, the process may estimate a time at which the vehicle will begin operating in the parking garage. Such an estimate may arise from determining the measured position of the vehicle, determining the position of the entrance to the parking garage, and calculating an estimated time at which the vehicle will enter the parking garage.

In an implementation, a determination that the vehicle 102 is or is about to enter a parking garage environment is based on data acquired from the GNSS chipset/component 132. More particularly, data acquired from the GNSS chipset/component 132 is used to determine the location of the vehicle and the location information is compared to map information to determine whether such location indicated by the GNSS chipset/component 132 corresponds to a parking garage location. A parking garage location may be defined as a geographical area. For example, a parking garage location may be defined by a set of locations that define a perimeter of a geographical area. Similarly, a parking garage location may be identified by a range of coordinates. For example, the vehicle location provided by the data acquired from the GNSS chipset/component 132 may be cross-referenced with a list of locations corresponding to parking garages. The cross-referencing may be performed by the telematics unit 114 of the vehicle 102, by other vehicle hardware components, by one of the servers 144 of the call center 108 of the TSP, or by other hardware elements of the TSP. In one implementation, the process summarized in FIG. 2 may determine that the vehicle is operating within a parking garage environment by analyzing heading change characteristics of vehicular movement. In such an implementation, analyzing heading change characteristics of vehicular movement involves determining the value of $S\_hd(k+L)-S\_hd(k)$, wherein $S\_hd(k)$ is the heading change accumulation at time k, and $S\_hd(k+L)$ is the heading change accumulation at time k+L. If $(k+L)-S\_hd(k) > 180°$, it may be determined that the vehicle is operating in a parking garage environment.

In one implementation, determining that the vehicle is entering or is about to enter a parking structure at step 200 involves a combination of analyzing data acquired from the GNSS chipset/component 132 and analyzing heading change characteristics of the vehicular movement. In such an implementation, determining that the vehicle is or is about to be operating within a parking structure is based on both analysis of the data acquired from the GNSS and analysis of heading change characteristics of vehicular movement. In an implementation, the likelihood that the vehicle is operating within a parking structure as determined by the analysis of the data acquired from the GNSS and the likelihood that the vehicle is operating within a parking structure as determined by the analysis of the heading change characteristics of the vehicular movement. Analyzing heading change characteristics may involve comparing a heading change accumulation calculated at a first time with a heading change accumulation calculated at a second time. Calculating the heading change accumulation at various point in time may involve receiving data from the vehicle sensors 139 and evaluating equations according to values contained within the data received form the vehicle sensors 139. In an implementation, quantitative values indicative of the likelihood that the vehicle is or is about to be operating within a parking structure may be provided based on an analysis of data acquired from the GNSS chipset/component 132 and based on an analysis of the heading change characteristics of the vehicular movement.

At step 210, a notification indicating that the vehicle is or is about to be operating in a parking structure is received by the dead reckoning engine 127 of the telematics unit 114 of the vehicle 102. Vehicle location data received by the dead reckoning engine 127 may be provided to the dead reckoning engine 127 by a server 144 at the call center 108 of the TSP, by a component of the electronic processing device 128, or by another component of the telematics unit 114 or of the vehicle hardware.

At step 220, the dead reckoning engine 127 activates a parking structure DR mode. The parking garage mode of the dead reckoning engine 127 may be a set of computer executable instructions stored at a computer readable medium. For example, the computer executable instructions may be stored at the one or more types of electronic memory 110.

At step 230, an estimated horizontal position error (EHPE) of the position of the vehicle 102 is calculated according to the parking garage mode of the dead reckoning engine. Determining the EHPE of the vehicle according to the parking garage mode of the DR engine may involve selecting an equation to use for calculating the EHPE of the vehicle and evaluating the selected equation. Selecting the equation to use for calculating the EHPE of the vehicle may involve specifying an EHPE calculation factor relation, an EHPE calculation factor delta relation, an offset detecting threshold, an EHPE calculation limiting threshold, and an accumulated heading change consideration threshold. A value for the EHPE calculation factor may be calculated using the EHPE calculation factor delta relation, the offset detecting threshold, the EHPE calculation factor limiting threshold, and the accumulated heading change consideration threshold. The EHPE calculation factor delta relation can specify that the EHPE calculation factor delta is equal to a first value if the accumulated heading change is less than the accumulated heading change consideration threshold and equal to a relation accounting for the accumulated heading change if the accumulated heading change is greater than the accumulated heading change consideration threshold.

In one implementation, at step 230 the EHPE of the position of the vehicle at time k is evaluated to be EHPE(k)=EHPE(k−1)+hE(k)·Δd(k) if $C_{EHPE}(N-1) \leq 1$ and determined to be $$EHPE(k) = \frac{EHPE(k-1) + hE(k) \cdot \Delta d(k)}{C_{EHPE}(N-1)}$$

if $C_{EHPE}(N-1) < 1$. hE(k) is the EHE of the vehicle at time k in radians, Δd(k) is the distance traveled from time k−1 to time k, and $C_{EHPE}(N-1)$ is a factor used to calculate EHPE where (N−1)·L≤k−j<NL. $C_{EHPE}(N)=C_{EHPE}(N+1)+\Delta C_{EHPE}(N)$ when k−j=NL, $C_{EHPE}(0)=0$, $C_{EHPE}(N)=T_2$ if $$C_{EHPE}(N) > T_2, \Delta C_{EHPE}(N) = 0 \text{ if } \frac{S_{hd}(k)}{360} < T_3,$$

-continued
$$\Delta C_{EHPE}(N) = \frac{S_{hd}(k)}{360} \text{ if } \frac{S_{hd}(k)}{360} \geq T_3,$$

$S_{hd}(k)=S_{hd}(k-1)+|\Delta Hd1(k)|$ when k=j+1, j+2, ... $S_{hd}(j)=0$, ΔHd(k)=|Hd(k)−Hd(k−1)|, ΔHd1(k)=|ΔHd(k)−360| if ΔHd(k)>$T_1$, and ΔHd1(k)=ΔHd(k) if ΔHd(k)≥$T_1$ where Hd(k) is the vehicular heading at time k. $T_1$ is a threshold used to detect if there is a 360 degrees offset between two adjacent heading values, $T_2$ is a threshold value to limit the maximum value of $C_{EHPE}(N)$, and $T_3$ is a threshold used to determine if the accumulated heading change is considered in the EHPE calculation factor. The threshold values for $T_1$, $T_2$, and for $T_3$ may be selected by a variety of methods. In some implementations, the threshold values for $T_1$, $T_2$, and for $T_3$ may be selected to be the same for all parking garage environments. In some implementations, threshold values for $T_1$, $T_2$, and for $T_3$ may be selected uniquely for each parking structure identified by the TSP or by another entity that catalogues information pertaining to parking garages. If threshold values for $T_1$, $T_2$, and for $T_3$ are uniquely selected for each parking structure, user feedback may be utilized to refine the threshold values unique to each structure.

Figure 3:
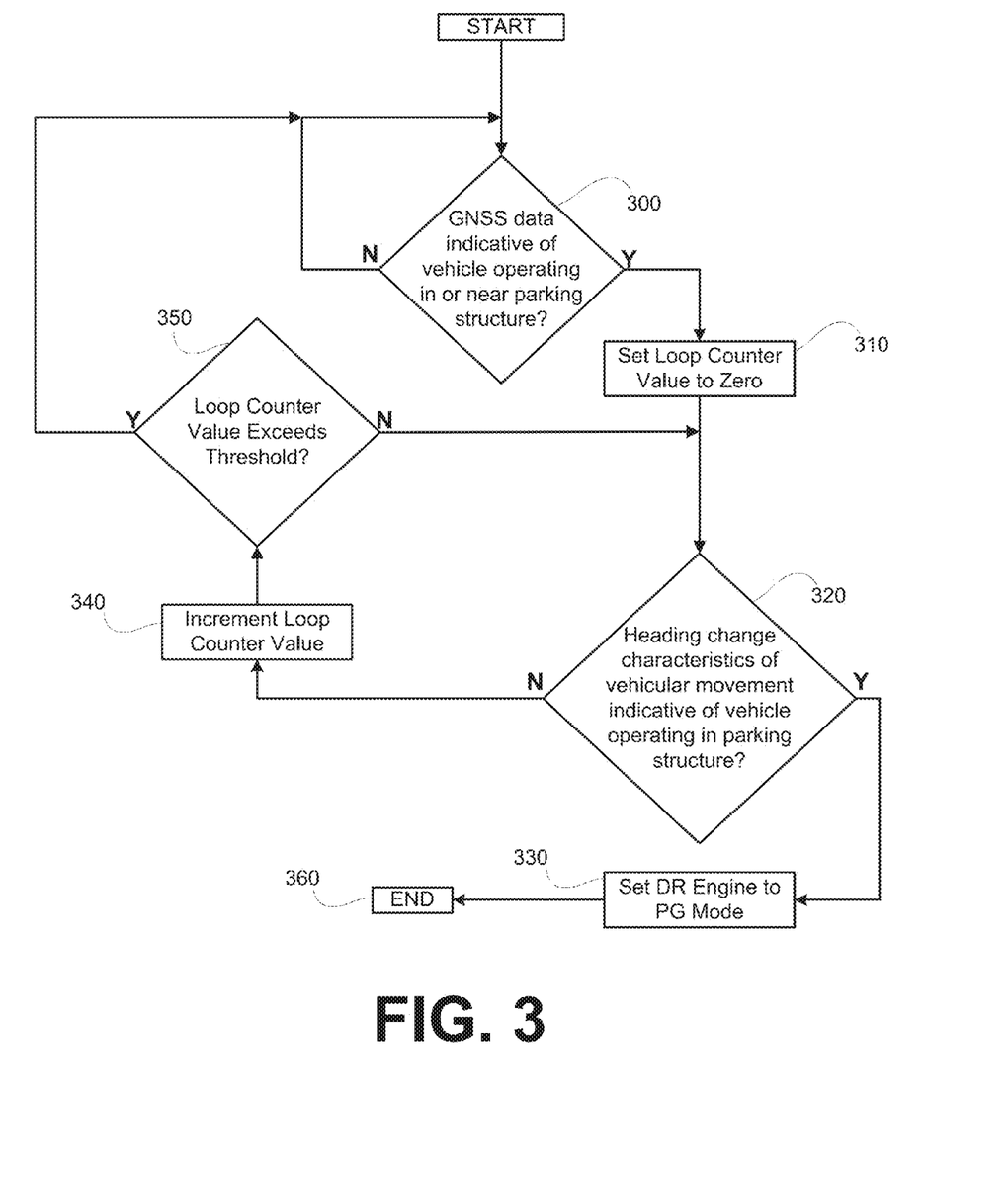
FIG. 3 is a flow chart summarizing an example process executed by a telematics service provider for determining whether a vehicle is currently operating in a parking structure or that operation of the vehicle within a parking structure is imminent.

FIG. 3 is a flow chart summarizing an example process executed by a telematics service provider for determining whether a vehicle is currently operating in a parking structure. At step 300, data acquired from the GNSS chipset/component 132 is analyzed to determine whether or not the vehicle is operating within a parking structure or is about to be operating within a parking structure. Analyzing, data acquired from the GNSS chipset/component 132 may involve determining the location of the vehicle as indicated by the GNSS chipset/component 132 and determining whether such location indicated by the GNSS chipset/component 132 corresponds to the location of a parking garage. For example, the location of the vehicle provided by the GNSS chipset/component 132 may be cross-referenced with a list of graphical areas corresponding to parking garages. The cross-referencing may be performed by the telematics unit 114 of the vehicle 102, by other vehicle hardware components, by one of the servers 144 of the call center 108 of the TSP, or by other hardware elements of the TSP. If it is determined that the vehicle is operating in or near a parking structure at step 300, the process proceeds to step 310. Alternatively, if it is determined that the vehicle 102 is not operating in or near a parking structure, the process returns to step 300.

At step 310, a loop counter is set to zero. The loop counter enables ensuing step 320 to be executed multiple times within a loop in order to allow the vehicle time to enter the parking garage in the event that the vehicle is merely operating near the parking garage when the initial determination is made at step 300. At step 320, data pertaining to heading change characteristics of vehicular movement is analayzed to determine whether the vehicle is operating within a parking structure. Analyzing heading change characteristics of vehicular movement at step 310 involves determining the value of S_hd(k+L)−S_hd(k), wherein S_hd(k) is the heading change accumulation at time k, and S_hd(k+L) is the heading change accumulation at time k+L. If (k+L)−S_hd(k)>180°, it is determined that the vehicle is operating in a parking garage environment, and the process proceeds to step 330 where the dead reckoning engine 127 of the telematics unit 114 of the vehicle 102 is set to a parking garage mode. Thereafter, the process proceeds to step 360 where the process ends.

Alternatively, if (k+L)−S_hd(k)≤180°, the process proceeds to step 340 where the loop counter is increased by one. At step 350, the process compares the value of the loop counter to a threshold value. If the loop counter is less than the threshold value, the process returns to step 320. However, if the loop counter is greater than or equal to the threshold value, the process returns to step 300.

Figure 4:
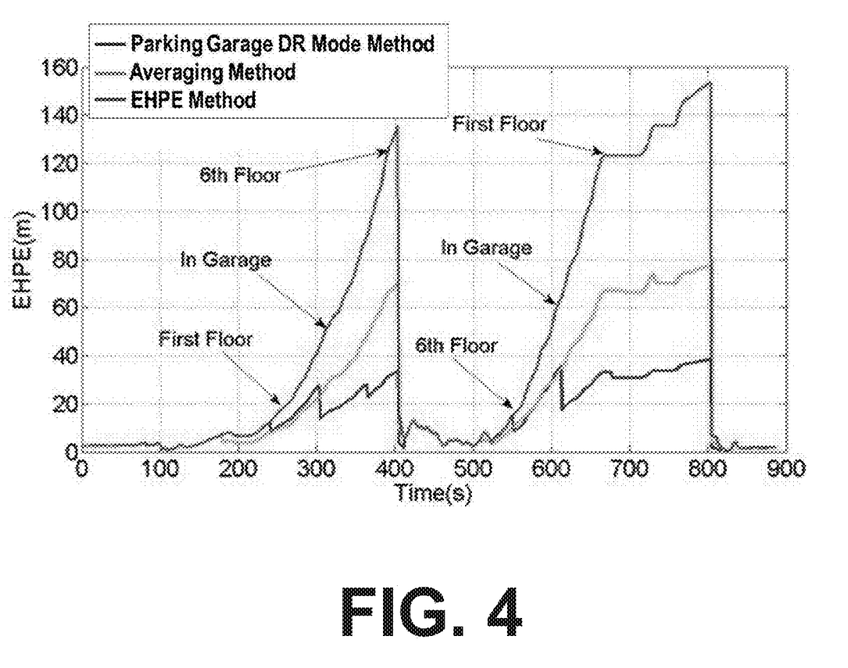
FIG. 4 is a graphical representation depicting the EHPE as determined by a variety of techniques.

FIG. 4 is a graphical representation depicting the EHPE as determined by a variety of techniques. FIG. 4 depicts the EHPE determined by three different techniques during a test drive of a vehicle within a parking structure. The test drive of the vehicle involved the vehicle being driven into the garage from an uncovered environment and driven from the first floor of the garage to the roof of the garage. On the roof, the vehicle was again in an uncovered environment. Thereafter, the vehicle was driven from the roof back to the first floor of the garage, and then out of the garage and back into an uncovered environment. In calculating the EHPE with the Parking Garage DR Mode Method, which is set forth in the description of step 230 of FIG. 2, threshold values of $T_1$, $T_2$, and $T_3$ were chosen to be 200 degrees, 4, and 0.6, respectively. The other two methods used to determine EHPE depicted in the graph determine EHPE by multiplying the estimated heading error (EHE) of the vehicle at time k by the distance traveled during a time interval beginning from a previous point in time at which the vehicle's EHPE was calculated (EHE Method), and by averaging the EHPE determined by the EHE Method and the EHPE determined by calculating the EHPE with the prediction covariance matrix of the Kalmar filter (Averaging Method).

It will be appreciated by those of skill in the art that the execution of the various machine-implemented processes and steps described herein may occur via the computerized execution of computer-executable recommendations stored on a tangible computer-readable medium, e.g., RAM, ROM, PROM, volatile, nonvolatile, or other electronic memory mechanism. Thus, for example, the operations performed by the telematics unit 114 may be carried out according to stored recommendations or applications installed on the telematics unit 114, and operation performed at the call center may be carried out according to stored recommendations or applications installed at the call center.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, implemented at a telematics unit of a vehicle, for calculating an estimated horizontal position error (EHPE) of a position of a vehicle, where the position of the vehicle is provided by a dead reckoning (DR) engine, the method comprising:
 determining that the vehicle is operating within a parking garage;
 triggering, in association with determining that the vehicle is operating within a parking garage, a parking garage mode for calculating an EHPE for the position of the vehicle provided by a DR engine; and
 calculating, according to the parking garage mode for calculating the EHPE, the EHPE for the position of the vehicle provided by the DR engine,
 wherein the parking garage mode for calculating an EHPE differs from at least one other mode for calculating an EHPE by the DR engine.

2. The method of claim 1, wherein determining that the vehicle is operating within a parking garage comprises analyzing data received from a GNSS.

3. The method of claim 1, wherein determining that the vehicle is operating within a parking garage comprises analyzing heading change characteristics of vehicular movement.

4. The method of claim 3, wherein analyzing heading change characteristics comprises comparing a heading change accumulation calculated at a first time with a heading change accumulation calculated at a second time.

5. The method of claim 3, wherein analyzing heading change characteristics of vehicular movement comprises:
 determining that $S_{hd}(k+L) - S_{hd}(k) > 180°$, wherein $S_{hd}(k)$ is the heading change accumulation at time k, and $S_{hd}(k+L)$ is the heading change accumulation at time k+L.

6. The method of claim 1, wherein determining the EHPE of the vehicle according to the parking garage mode of the DR engine comprises multiplying a distance traveled by an estimated heading error (EHE).

7. The method of claim 1, wherein determining the EHPE of the vehicle according to the parking garage mode of the DR engine comprises:
 selecting an equation to use for calculating the EHPE of the vehicle; and
 evaluating the selected equation;
 wherein selecting the equation to use for calculating the EHPE of the vehicle comprises:
 specifying an EHPE calculation factor relation, an EHPE calculation factor delta relation, an offset detecting threshold, an EHPE calculation limiting threshold, and an accumulated heading change consideration threshold;

calculating a value for the EHPE calculation factor using the EHPE calculation factor delta relation, the offset detecting threshold, the EHPE calculation factor limiting threshold, and the accumulated heading change consideration threshold; and selecting an equation to use for calculating the EHPE of the vehicle based on the calculated value of the EHPE calculation factor.

8. The method of claim 7, wherein the EHPE calculation factor delta relation specifies that the EHPE calculation factor delta is equal to a first value if the accumulated heading change is less than the accumulated heading change consideration threshold and equal to a relation accounting for the accumulated heading change if the accumulated heading change is greater than the accumulated heading change consideration threshold.

9. The method of claim 1, wherein determining the EHPE of the vehicle according to the parking garage mode of the DR engine comprises:

determining that $EHPE(k)=EHPE(k-1)+hE(k) \cdot \Delta d(k)$ if $C_{EHPE}(N-1) \leq 1$; and determining that $$EHPE(k) = \frac{EHPE(k-1) + hE(k) \cdot \Delta d(k)}{C_{EHPE}(N-1)}$$

if $C_{EHPE}(N-1)>1$;

wherein $EHPE(k)$ is the EHPE at time k, $hE(k)$ is the EHE of the vehicle at time k in radians, $\Delta d(k)$ is the distance traveled from time k-1 to time k, $C_{EHPE}(N-1)$ is a factor used to calculate EHPE, and $(N-1) \cdot L \leq k-j<NL$, and wherein $C_{EHPE}(N)=C_{EHPE}(N+1)+\Delta C_{EHPE}(N)$ when $k-j=NL$, $C_{EHPE}(0)=0$, N is a positive integer, $C_{EHPE}(N)=T_2$ if $C_{EHPE}(N)>T_2$, $\Delta C_{EHPE}(N)=0$ if $$\frac{S_{hd}(k)}{360} < T_3, \Delta C_{EHPE}(N) = \frac{S_{hd}(k)}{360} \text{ if } \frac{S_{hd}(k)}{360} \geq T_3,$$

$S_{hd}(k)=S_{hd}(k-1)+|\Delta Hd(k)|$ when $k=j+1, j+2, \ldots$, $S_{hd}(j)=0$, $\Delta Hd(k)=|Hd(k)-Hd(k-1)|$, $\Delta Hd1(k)=|\Delta Hd(k)-360|$ if $\Delta Hd(k)>T_1$, and $\Delta Hd1(k)=\Delta Hd(k)$ if $\Delta Hd(k) \leq T_1$ where $Hd(k)$ is the vehicular heading at time k; and wherein $T_1$ is a threshold used to detect if there is a 360 degrees offset between two adjacent heading values, $T_2$ is a threshold value to limit the maximum value of $C_{EHPE}(N)$ and $T_3$ is a threshold used to determine if the accumulated heading change is considered in the EHPE calculation factor.

10. The method of claim 9, wherein $T_2$ is any value greater than 2 and $T_3$ is any value greater than 0.5.

11. A non-transitory computer readable medium having stored thereon a set of computer executable instructions for calculating the estimated horizontal position error (EHPE) of a position of a vehicle, wherein the position of the vehicle is provided by a dead reckoning (DR) engine, the set of instructions comprising instructions for:

determining that the vehicle is operating within a parking garage;

triggering, in association with determining that the vehicle is operating within a parking garage, a parking garage mode for calculating an EHPE for the position of the vehicle provided by a DR engine; and calculating, according to the parking garage mode for calculating the EHPE, the EHPE for the position of the vehicle provided by the DR engine, wherein the parking garage mode for calculating an EHPE differs from at least one other mode for calculating an EHPE by the DR engine.

12. The non-transitory computer readable medium of claim 11, wherein determining that the vehicle is operating within a parking garage comprises analyzing data received from a GNSS.

13. The non-transitory computer readable medium of claim 11, wherein determining that the vehicle is operating within a parking garage comprises analyzing heading change characteristics of vehicular movement.

14. The non-transitory computer readable medium of claim 13, wherein analyzing heading change characteristics of vehicular movement comprises:

determining that $S_{hd}(k+L)-S_{hd}(k)>180°$, wherein $S_{hd}(k)$ is the heading change accumulation at time k, and $S_{hd}(k+L)$ is the heading change accumulation at time k+L.

15. The non-transitory computer readable medium of claim 11, wherein determining the EHPE of the vehicle according to the parking garage mode of the DR engine comprises multiplying a distance traveled by an estimated heading error (EHE).

16. The non-transitory computer readable medium of claim 15, wherein determining the EHPE of the vehicle according to the parking garage mode of the DR engine comprises:

determining that $EHPE(k)=EHPE(k-1)+hE(k) \cdot \Delta d(k)$ if $C_{EHPE}(N-1) \leq 1$; and determining that $$EHPE(k) = \frac{EHPE(k-1) + hE(k) \cdot \Delta d(k)}{C_{EHPE}(N-1)}$$

if $C_{EHPE}(N-1)>1$;

wherein $EHPE(k)$ is the EHPE at time k, $hE(k)$ is the EHE of the vehicle at time k in radians, $\Delta d(k)$ is the distance traveled from time k-1 to time k, $C_{EHPE}(N-1)$ is a factor used to calculate EHPE, and $(N-1) \cdot L \leq k-j<NL$, and wherein $C_{EHPE}(N)=C_{EHPE}(N+1)+\Delta C_{EHPE}(N)$ when $k-j=NL$, $C_{EHPE}(0)=0$, N is a positive integer, $C_{EHPE}(N)=T_2$ if $C_{EHPE}(N)>T_2$, $$\Delta C_{EHPE}(N) = 0 \text{ if } \frac{S_{hd}(k)}{360} < T_3,$$

$$\Delta C_{EHPE}(N) = \frac{S_{hd}(k)}{360} \text{ if } \frac{S_{hd}(k)}{360} \geq T_3,$$

$$S_{hd}(k) = S_{hd}(k-1) + |\Delta Hd(k)|$$

when $k=j+1, j+2, \ldots$, $S_{hd}(j)=0$, $\Delta Hd(k)=|Hd(k)-Hd(k-1)|$, $\Delta Hd1(k)=|\Delta Hd(k)-360|$ if $\Delta Hd(k)>T_1$, and $\Delta Hd1(k)=\Delta Hd(k)$ if $\Delta Hd(k) \leq T_1$ where $Hd(k)$ is the vehicular heading at time k; and wherein $T_1$ is a threshold used to detect if there is a 360 degrees offset between two adjacent heading values, $T_2$ is a threshold value to limit the maximum value of $C_{EHPE}(N)$ and $T_3$ is a threshold used to determine if the accumulated heading change is considered in the EHPE calculation factor.

17. The non-transitory computer readable medium of claim 16, wherein $T_2$ is any value greater than 2 and $T_3$ is any value greater than 0.5.

18. A telematics unit configured to receive GNSS signals and to determine the position of a vehicle through dead reckoning (DR) techniques when it is unable to receive GNSS signals, the telematics unit comprising:
   a non-transitory computer-readable medium including computer-executable instructions; and
   a processor configured to execute the computer-executable instructions to perform a method comprising:
      determining that the vehicle is operating within a parking garage;
      triggering, in association with determining that the vehicle is operating within a parking garage, a parking garage mode for calculating an estimated horizontal position error (EHPE) for the position of the vehicle provided by a DR engine; and
      calculating, according to the parking garage mode, the EHPE for the position of the vehicle provided by the DR engine,
      wherein the parking garage mode for calculating an EHPE differs from at least one other mode for calculating an EHPE by the DR engine.

19. The telematics unit of claim 18, wherein determining that the vehicle is operating within a parking garage comprises analyzing data received from a GNSS.

20. The telematics unit of claim 18, wherein determining that the vehicle is operating within a parking garage comprises analyzing heading change characteristics of vehicular movement.

* * * * *